Jan. 14, 1958 W. CAMBEIS 2,819,936
PISTON, ESPECIALLY FOR INTERNAL COMBUSTION ENGINES
Filed July 20, 1955 2 Sheets-Sheet 1

Inventor:
Walter Cambeis
By
Patent Agent

Jan. 14, 1958  W. CAMBEIS  2,819,936
PISTON, ESPECIALLY FOR INTERNAL COMBUSTION ENGINES
Filed July 20, 1955  2 Sheets-Sheet 2

Inventor:
Walter Cambeis
By
Patent Agent

United States Patent Office 2,819,936
Patented Jan. 14, 1958

2,819,936
PISTON, ESPECIALLY FOR INTERNAL COMBUSTION ENGINES

Walter Cambeis, Essen-Bredeney, Germany, assignor to Fried. Krupp Motoren- und Kraftwagenfabriken G. m. b. H., Essen, Germany Application July 20, 1955, Serial No. 523,317

Claims priority, application Germany August 3, 1954

11 Claims. (Cl. 309—16)

The present invention relates to a piston-connecting rod arrangement, especially for internal combustion engines, and is of particular advantage for two-stroke cycle engines, although it is, by no means, limited thereto.

With heretofore known piston-connecting rod arrangements, the piston is generally connected to the connecting rod by means of a wrist pin, while the piston is guided along the cylinder running surface by means of piston rings. The thus resulting rigid kinematic association of piston and driving mechanism may, particularly when heat expansions occur during operation, bring about jamming and canting of the piston thereby causing wear and damages. In addition thereto, the eyes for the wrist pin require local accumulation of material, while the bores for the wrist pin bearing require interruptions in the cylindrical piston skirt so that unilateral deformations will occur and the piston will unevenly be supported.

In order to overcome this last mentioned drawback, it has been suggested to grind the piston free within the range of the bearing eyes. This suggestion, however, has not eliminated the principal drawback set forth above.

Furthermore, the running surface of the piston is interrupted by the bores for the bearing and the free grinding referred to above brings about an uneven circumferential play between piston and cylinder as a result of which the lubricating oil film and thus the lubrication of the piston and the adjacent cylinder surfaces is harmfully affected. Numerous other damages are due to these circumstances.

It has furthermore been attempted to prevent the damage caused by the kinematic deficiency of the driving mechanism by increasing the play and tolerances in the bearing for the wrist pin and at the sliding surfaces of the piston. However, also these attempts have had no material success. In order to prevent the drawbacks inherent to an interrupted piston skirt, the piston skirt has been designed without interruption while a stool-like supporting member or socket member has been arranged inside the piston for journalling the wrist pin. The employment of the wrist pin as rigid connecting element between piston and connecting rod has, however, been maintained.

While the drawback of this wrist pin connection has been recognized and for instance a yieldable connection between piston and connecting rod has been suggested by designing the respective end of the connecting rod as ball and journalling the same in a ball-shaped cup or socket, heretofore the requirements to be met with such an arrangement have not been recognized. For this reason, such a construction has not yet been adopted in practice i. e. prior to the present invention.

It is also known non-rotatably to connect the pistons of internal combustion engines to their respective connecting rod while the longitudinal axes of said pistons are eccentrically offset with regard to the respective longitudinal axes of said connecting rod. The purpose of such an arrangement consists in causing the longitudinal axis of the respective connecting rod during the downward movement of the latter to assume as parallel a position as possible with regard to the direction of movement of the piston in order to reduce the lateral forces exerted by the respective piston upon the adjacent cylinder wall. At the same time, it is intended in this way to prevent a piston slap and the noise inherent thereto, and to reduce the increased wear of the piston running surface. Furthermore, it was hoped that in this way also a balancing of the weight of the piston could be obtained which in turn would reduce the tendency of the piston to produce a piston slap when wear has occurred. This arrangement, however, has not yielded the expected result.

With such piston-connecting rod arrangement, each skirt line of the piston has associated therewith a certain mantle line of the cylinder in the same manner as it is the case with wrist pin connections between piston and connecting rod. Thus, each skirt strip of the piston must run itself in with the respective mantle strip of the cylinder pertaining thereto. Due to machining inaccuracies during the production of piston and cylinder, and due to non-uniform heat expansion of piston and cylinder during operation, the frictional resistances at the various circumferential sections of piston and cylinder are of different magnitude and consequently produce different increases in temperature in the piston which is already subjected to great heat so that after a relatively short running period the piston begins to seize.

It is, therefore, an object of the present invention to provide a piston-connecting rod arrangement which will overcome the above mentioned drawbacks.

It is another object of this invention to provide a connection between the piston and connecting rod therefor of an internal combustion engine, which will make it possible to produce a rotation or oscillation of the piston in the cylinder during operation of the piston.

Still another object of this invention consists in the provision of a connection between piston and connecting rod therefor, which will allow an improved cooling of the piston.

It is a still further object of this invention to provide a connection of a piston with its connecting rod, especially for internal combustion engines, which will bring about an improved lubrication of piston and cylinder.

These and other objects and advantages of the invention will appear more clearly from the following specification in connection with the accompanying drawing, in which.

General arrangement

Figure 1:
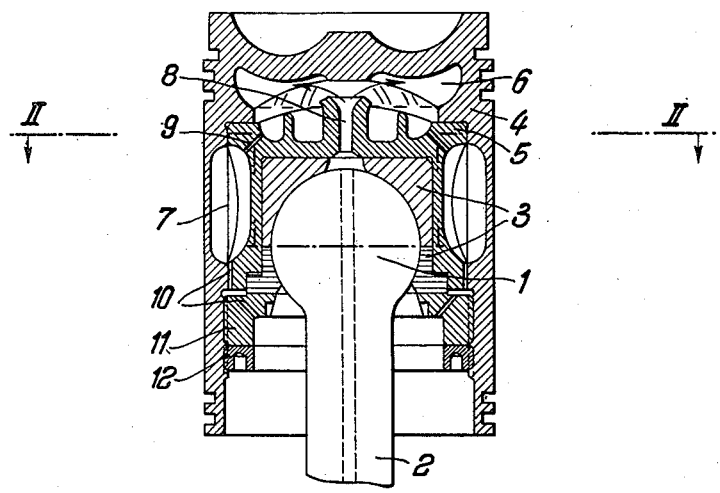
Fig. 1 illustrates a central vertical section through a piston-connecting rod arrangement according to the present invention, said section being taken along the line I—I of Fig. 2.

According to the present invention, the central axis of the piston is offset with regard to the central axis of the connecting rod in contrast to the heretofore known arrangement according to which the central axes of these rotative parts register with each other. Due to the arrangement according to the invention, that component of the connecting rod force which during reciprocation of the piston acts perpendicular to the cylinder running surface is caused to be effective eccentrically with regard to the piston thereby producing a torque with regard to the support of the piston by the cylinder running surface. This torque causes the reciprocating piston to rotate against the frictional force effective upon the circumferential surface of the piston. At both dead center points of the piston, the said component of the connecting rod force changes its direction. By selecting and dimensioning the eccentricity of the central piston axis with regard to the central axis of the connecting rod and by controlling the coefficient of friction by a corresponding selection of the material for the sliding surfaces, the said rotative movement of the piston may be controlled at random so that the piston will either rotate or oscillate about the vertical axis of the ball-shaped end of the connecting rod. In view of this spiral movement of the piston, which movement is composed of an axial and rotative movement of the piston, all points of the piston skirt during a stroke continuously change their connecting points with the cylinder running surface so that a sliding operation is performed somewhat similar to the finest honing of the running surfaces of piston and cylinder.

This rotative or oscillating movement favorably affects the lubrication of the piston because due to said rotative movement of the piston, the lubricating oil passes from that side of the piston which is under no load to that side of the piston which is under load and forms a lubricating film on said last mentioned side.

The invention is applicable with ordinary piston rods having a ball-shaped head journalled in a corresponding socket in the piston, and may also be employed when effecting a connection between piston and connecting rod by means of a rotative socket or supporting member in connection with a wrist pin. The invention is furthermore applicable in connection with arrangements according to which the ball-shaped head of the connecting rod is journalled in a rotatable supporting or socket member. When employing a rotatable socket in which the preferably ball-shaped head of the connecting rod is located, the central axis of the bearing for the connecting rod head may be arranged eccentrically with regard to the central axis of the rotative socket or with regard to the central axis of the piston, and/or with regard to the central axes of both said rotative socket and said piston, while the piston body may be freely rotatably journalled at the upper and lower end of the rotative socket. Such free rotatable journalling of the piston on the rotative socket may be obtained by selecting appropriate materials for the piston and the socket or by providing anti-friction bearings between piston and rotative socket.

According to a further development of the invention, the piston is provided with recesses for receiving cooling fluid, that is preferably lubricating oil, to cool the respective piston walls. By appropriately dimensioning the discharge bores of the various recesses, the fluid discharged under pressure from the connecting rod is forced to fill said recesses or chambers completely whereby large surfaces of the piston top and piston skirt can convey heat to said fluid. By appropriately shaping the discharge passage means for discharging the cooling fluid from chambers formed by recesses in the piston and by said rotative socket, the flow of the cooling fluid is so guided that it will be passed by the interior surface of the piston top and piston skirt so that an intensive heat conduction is assured.

The rotative movements of the piston arranged eccentrically with regard to the central axis of the connecting rod, and the forced cooling by means of the cooling fluid under pressure are obtainable, as mentioned above, when journalling the ball-shaped head of the connecting rod in a corresponding socket in the piston as well as when connecting the connecting rod to the piston by means of a rotative socket or supporting member in connection with a wrist pin. However, in the last mentioned instance, the above mentioned kinematic freedom of the piston is limited.

In certain instances, the rotative movement of the piston brought about by the present invention may also be taken advantage of for controlling certain operations.

*Structural arrangement*

Referring now to the drawing in detail, the free end 1 of the connecting rod 2 is ball-shaped and is journalled in a correspondingly shaped two-part socket or cup 3. This socket or cup 3 is mounted in a rotative socket 5 against which rests the piston 4 in longitudinal direction thereof and transverse thereto. Between the rotative socket 5 and the piston top 4a, and also between the piston skirt 4b and the rotative socket 5 there are provided chambers 6 and 7 into which ribs 7b extend for purposes of reinforcement, said ribs being provided at the boundary surfaces. The connecting rod is provided with passage means through which cooling fluid passes into a discharge stud 8. This discharge stud is so designed that the cooling fluid flows along the lower side of the piston top 4a thereby absorbing heat therefrom. In order to be sure that the chamber 6 is always filled with cooling fluid so that the piston top 4a is always contacted by cooling fluid, the discharge bores 9 are so dimensioned that in the chamber 6 there will always be a pressure higher than the pressure in the chamber 7. The cooling fluid will in this way be pressed through bores 9 into the chambers 7 and will be passed against the piston skirt 4. Also the bores 10 through which the cooling fluid is discharged from the chambers 7 are so dimensioned that the chambers 7 will always be maintained filled with cooling fluid. In this way, an intensive cooling of piston top and piston skirt is assured. The cup 3 and also the rotative socket 5 are arrested in longitudinal direction of the piston by means of a supporting ring 11. By tightening the ring 11 more or less, the power lock between the rotative socket 5 and the piston may be varied. The supporting ring furthermore absorbs the upwardly directed forces which occur with four-stroke cycle engines and are produced by the mass forces during idling. A counter nut 12 is provided for securing the adjusted position of the supporting ring 11.

Figure 2:
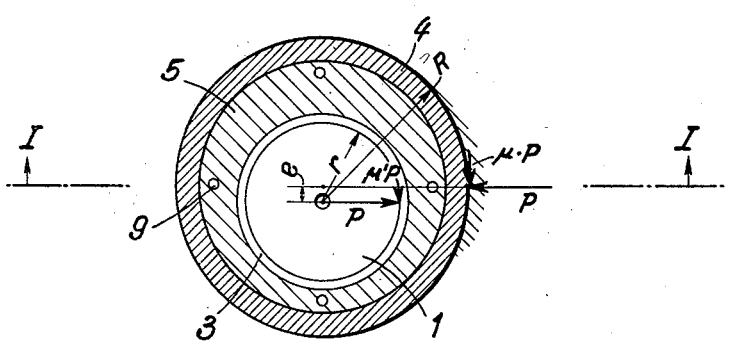
Fig. 2 is a section taken along the line II—II of Fig. 1.

Fig. 2 illustrates the forces which occur with the eccentrically journalled piston according to the invention. The torque turning about the center of the ball head 1 of the connecting rod is of a magnitude $P \times e$ and is acted against by the torque of the frictional forces $R \times \mu \times P$ plus $r \times \mu' \times P$. When the piston radius R is given and the frictional conditions on the running surfaces of the piston and cylinder and also on the ball head are known, the minimum value of the eccentricity $e$ is determined. With high values of $e$, the rotative movement of the piston is increased so that the mass of the piston swings beyond the position of equilibrium and the rotative movement is continued when the force P changes its direction at the lower dead center point. This process corresponds to a continuous revolution of the central axis of the piston about the center of the ball head of the connecting rod. With smaller values of $e$ or higher values of the coefficient of friction $\mu$ and $\mu'$, the rotative movement is not as intensive as the higher values of $e$ or lower values of the coefficients of friction so that the rotation of the piston stops ahead of the position of equilibrium and when the force P changes its direction, the rotation of the piston is effected in an inverse manner. This process corresponds to an oscillation of the central axis of the piston about the center of the ball of the connecting rod.

The eccentricity between the piston and the connecting rod can be obtained by eccentrically journalling the rotative socket or by eccentrically journalling the piston or by eccentrically journalling both said piston and said rotative socket. When providing an eccentric journalling between ball head and rotative socket and also between rotative socket and piston, it is possible by clamping the rotative socket 5 against the piston by means of the supporting ring 12 to such an extent that a relative movement between the rotative socket and the piston will be eliminated. However, by employing anti-friction thrust bearings at the upper and lower end of the rotative socket, an easy relative movement between the piston and the rotative socket 5 can be made possible.

The arrangement according to the invention will yield a positive continuous turning movement of the piston during the operation due to the eccentricity of the piston and thus will assure excellent running properties of the piston. In addition thereto, the forced admission of cooling means preferably lubricating oil under pressure in conformity with the invention will secure a good heat conduction and thereby a good cooling of the piston.

The arrangement according to the invention is particularly suitable for two-stroke cycle engines in which no change in the direction of the force will occur during operation so that the supporting ring 12 will be relieved of operating forces and can be used for controlling the power lock between the rotative socket and the piston.

Figure 3:
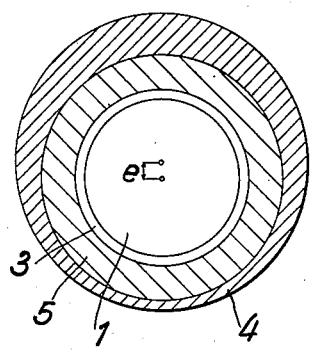
Figs. 3 and 4 are other horizontal sections through a piston connecting rod arrangement.

Fig. 3 shows a journal of the upper end of the connecting rod 1 in the rotative socket 5, the latter being positioned eccentrically in regard to the piston 4 by a value of $e$.

Figure 4:
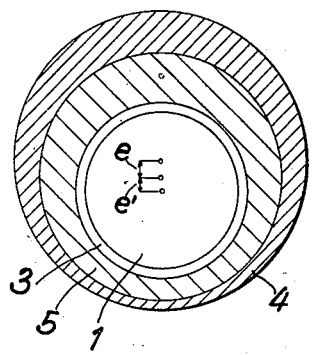

In Fig. 4 the axis of the connecting rod 1 is positioned eccentrically in regard to the rotatable socket 5 by a value of $e'$ and the rotatable socket 5 is positioned eccentrically in regard to the piston 4 by a value of $e$, so that total eccentricity amounts to $e+e'$.

Figure 5:
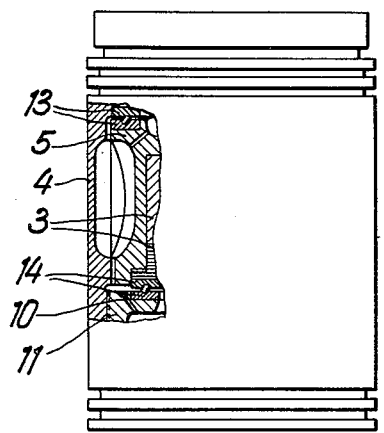
Fig. 5 shows a journal on a rotatable socket.

In Fig. 5 antifriction bearings 13, 14 are arranged between the rotatable socket 5 and the piston 4, whereby an unimpeded rotation of the piston 4 about the rotatable socket 5 is achieved.

Figure 6:
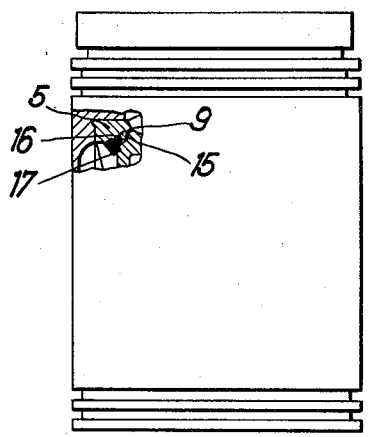
Fig. 6 shows a valve placed in the passage means for the cooling means.

In Fig. 6 a valve is illustrated, which is arranged in a passage 9 in the rotatable socket which passage conveys the cooling means. The valve consists of a ball 15 which under the pressure of the liquid opens the passage against the pressure of a spring 16. The ball 15 and the spring 16 are held in the rotatable socket by a hollow screw 17.

Figure 7:
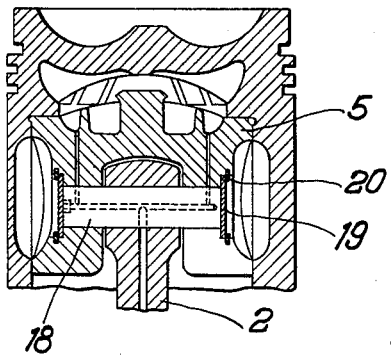
Fig. 7 shows another embodiment of the connection of the connecting rod to a rotatable socket.

Fig. 7 illustrates a connection of the connecting rod with the rotatable socket by a wrist pin 18. In this arrangement the wrist pin bore is closed by disks 19 and spring washers 20, so that no liquid can escape through the wrist pin bore.

It is, of course, understood that the present invention is, by no means, limited to the particular arrangement shown in the drawing but also comprises any modifications within the scope of the appended claims.

What I claim is:

1. In combination in a cylinder of an internal combustion engine: a piston rotatably and reciprocably mounted in said cylinder, a connecting rod, and a socket rotatably mounted within said piston and comprising supporting means supporting the adjacent end of said connecting rod, the central axis of the supporting means for said adjacent connecting rod end being eccentrically arranged with regard to the central axis of said piston whereby said piston will positively be caused to turn about its longitudinal axis in response to an axial movement of said piston in said cylinder.

2. In combination: a rotatable and axially movable piston, a connecting rod having a ball-shaped end adjacent said piston, and a socket member rotatably mounted within said piston and comprising means journalling said ball-shaped end of said connecting rod, the central axis of said piston being eccentrically arranged with regard to the central axis of said connecting rod, whereby said piston will positively be caused to turn about its longitudinal axis in response to an axial movement of said piston.

3. In combination: a rotatable and axially movable piston, a connecting rod, and a socket member rotatably mounted within said piston and comprising means supporting the adjacent end of said connecting rod, the central axis of said supporting means being eccentrically arranged with regard to the central axis of said socket member, and said rotatable socket member being freely rotatably journalled at opposite ends thereof in said piston.

4. In combination: a piston having an uninterrupted piston skirt, a connecting rod, a rotatable socket mounted within said piston and comprising means supporting the adjacent end of said connecting rod, the central axis of the supporting means for said adjacent connecting rod end being eccentrically arranged with regard to the central axis of said rotatable socket, and anti-friction bearing means interposed between said piston and said rotatable socket to allow free relative rotation between said piston and said rotatable socket.

5. In combination: a rotatable and axially movable piston having the inside thereof provided with recesses adjacent the piston top and the piston skirt, a connecting rod having passage means therethrough extending in longitudinal direction of said connecting rod for conveying cooling means therethrough, and a socket member rotatably mounted within said piston and comprising supporting means supporting the adjacent end of said connecting rod, the central axis of said supporting means being eccentrically arranged with regard to the central axis of said socket member, said socket member confining with said recesses chambers communicating through said socket member with said passage means and communicating with each other through restrictive passage means in said rotatable socket.

6. A piston-connecting rod arrangement according to claim 5, which includes valve means serving as restrictive passage means.

7. In combination: a rotatable and axially movable piston having the inside thereof provided with recess means, a connecting rod having passage means therethrough extending in longitudinal direction of said connecting rod for conveying cooling means preferably lubricating oil therethrough, and a socket member rotatably mounted within said piston and comprising supporting means supporting the adjacent end of said connecting rod, said socket member confining with said recess means chamber means for receiving cooling means from said passage means in said connecting rod, said socket member including conduit means extending toward the top of said piston and establishing fluid communication between said passage means and said chamber means to thereby force the cooling means from said passage means to pass by the inside of the piston top, the central axis of the said supporting means being eccentrically arranged with regard to the central axis of said socket member.

8. A piston-connecting rod arrangement according to claim 7, in which said chamber means is arranged adjacent the inner surface of the piston top and communicates with discharge channel means partly confined by the inside of said piston.

9. In an internal combustion engine: a cylinder, a piston rotatably and reciprocably mounted in said cylinder, a connecting rod, the longitudinal axis of said piston and the longitudinal axis of said connecting rod being at all times arranged eccentrically with regard to each other, and connecting means axially rotatably connecting said piston to said connecting rod to permit rotation of said piston about its longitudinal axis whereby said piston will positively be caused to turn about its longitudinal axis in response to an axial movement of said piston in said cylinder.

10. In an internal combustion engine: a cylinder, a piston rotatably and reciprocably mounted in said cylinder, a connecting rod, the longitudinal axis of said piston and the longitudinal axis of said connecting rod being at all times arranged eccentrically with regard to each other, a socket member interposed between said connecting rod and said piston and rotatably mounted therein, and means arranged within said socket member for interconnecting said connecting rod and said socket member.

11. In an internal combustion engine: a cylinder, a piston rotatably and reciprocably mounted in said cylinder, a connecting rod, a socket member interposed between said connecting rod and said piston and rotatably mounted in said piston, and supporting means mounted within said socket member and supporting that end of said connecting rod which is adjacent said piston, the central axis of said supporting means being eccentrically arranged with regard to the axis of rotation of said socket member whereby said piston will positively be caused to turn about its longitudinal axis in response to an axial movement of said piston in said cylinder.

References Cited in the file of this patent

UNITED STATES PATENTS

| | | |
|---|---|---|
| 364,627 | Arnold | June 14, 1887 |
| 1,138,892 | Roberts | May 11, 1915 |
| 1,339,760 | Houston | May 11, 1920 |
| 1,474,325 | Kallmeyer | Nov. 13, 1923 |
| 1,545,930 | Vincent | July 14, 1925 |
| 2,012,874 | Godsell | Aug. 27, 1935 |
| 2,107,795 | Larsh | Feb. 8, 1938 |
| 2,563,371 | Rippingille | Aug. 7, 1951 |
| 2,687,931 | Flynn | Aug. 31, 1954 |